Jan. 6, 1959

P. R. WEAVER 2,867,382

MANEUVERING LOADS ACCELEROMETER

Filed June 29, 1954

INVENTOR
PRESTON R. WEAVER

BY

ATTORNEYS

United States Patent Office 2,867,382
Patented Jan. 6, 1959

2,867,382

MANEUVERING LOADS ACCELEROMETER

Preston R. Weaver, Boulder, Colo., assignor to the United States of America as represented by the Secretary of the Navy Application June 29, 1954, Serial No. 440,299

6 Claims. (Cl. 235—92)

(Granted under Title 35, U. S. Code (1952), sec. 266)

The invention described herein may be manufactured and used by or for the Government of the United States of America for governmental purposes without the payment of any royalties thereon or therefor.

The present invention relates to a maneuvering loads accelerometer for obtaining flight load data for use in predicting life of aircraft and more particularly to an improved accelerometer for the measurement and registering of the number of times predetermined percents of limit loads occur on aircraft during maneuvers.

The prior known maneuvering loads accelerometers have not been satisfactory since the predeflected cantilever beams employed as sensing elements were so arranged in the counting circuits as to react to any high-frequency low-amplitude accelerations superimposed upon the primary acceleration wave, thus making it impossible to register the actual number of times the instrument had been subjected to predetermined accelerations.

An object of the present invention is the provision of a maneuvering loads accelerometer for accurately registering the occurrence of flight phenomena of predetermined intensities in aircraft.

Another object is the provision of a maneuvering loads accelerometer for registering flight phenomena of predetermined magnitude without regard to minor variations of the phenomena.

A further object is the provision of a maneuvering loads accelerometer for registering the number of times predetermined accelerations occur during aircraft flight without regard to any high-frequency low-amplitude accelerations superimposed upon the primary acceleration wave.

Other objects and many of the attendant advantages of this invention will be readily appreciated as the same becomes better understood by reference to the following detailed description when considered in connection with the accompanying drawings wherein.

Figure 1:
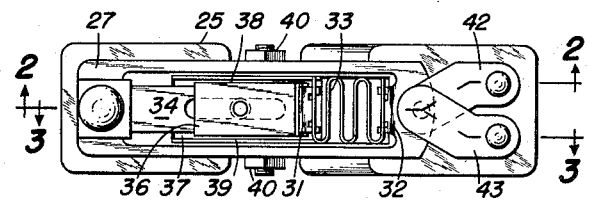
Fig. 1 is a plan view of the sensing element of the present invention.
Figure 2:
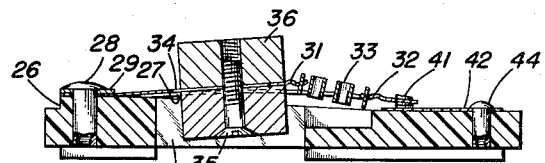
Fig. 2 is a view in section taken along line 2—2 of Fig. 1 showing the sensing element in its normal open position.
Figure 3:
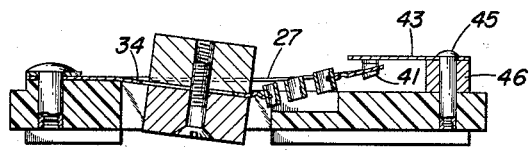
Fig. 3 is a view in section taken along line 3—3 of Fig. 1 showing the sensing element in its closed position.
Figure 5:
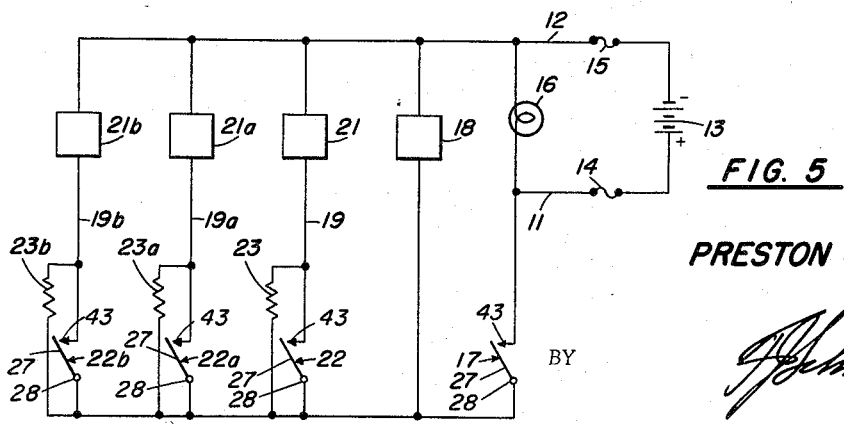
Fig. 5 is a schematic view showing the electrical connections of the present invention.

Referring more particularly to the drawing, microswitches, such as shown in detail in Figs. 1–3, are used as the sensing elements in the circuit diagram of Fig. 5. As shown in Fig. 5, a hot lead 11 and a return lead 12 are connected to a source of current 13 through fuses 14 and 15. A pilot light 16 may be connected between the leads 11 and 12, as shown, to provide a visual indication of whether or not current is flowing through the fuses. The fuses and the pilot light are incorporated in the circuit of Fig. 5 as safety features, but are not necessary to render the circuit operable and may be omitted if desired. A microswitch 17, such as shown in Fig. 1, is connected at screws 28 and 45 thereof in the lead 11 as a reference sensing element and a counter 18 is connected between the leads 11 and 12 to count the number of times the switch 17 is closed. A plurality of registering units indicated generally at 19, 19a and 19b are connected between the leads 11 and 12 in parallel with the counter 18. Each of the registering units 19, 19a and 19b may consist of a counter 21, 21a and 21b, a microswitch sensing element 22, 22a and 22b shunted by a resistor 23, 23a and 23b of an appropriate value depending upon the coil resistance of the specific counter used.

The microswitch of Fig. 1 consists of a body 25 formed of Bakelite, plastic or similar non-conducting material. A raised portion 26 is formed at one end of the body upon which a snap-action type switch leaf 27 is mounted by means of screw 28 and retaining washer 29. The interior portion of switch leaf 27 is cut out to define oppositely extending tongue 31 and short projection 32, the adjacent ends of which are joined by compression spring 33. The tongue 31 is longitudinally slotted as at 34 to receive a bolt 35 which secures the two halves of a mass 36 to the tongue, the slot permitting the mass to be selectively positioned on the tongue. A central opening 37 is provided in the body 25 to permit vertical movement of the mass 36. A pair of damping plates 38 and 39 are secured to opposite sides of the opening 37 by means of bolts and nuts 40. The free end of switch leaf 27 is provided with a contact 41 near its extremity which lies between the spaced contacts 42 and 43. The lower contact 42 is secured to the body 25 by screw 44 and extends beneath the contact 41. The upper contact 43 overlies the contact 41 and is spaced above the body 25 by means of screw 45 and spacer 46.

In each of the microswitches, the switch leaf 27 thereof is connected to lead 11 through screw 28. The contact 43 of each switch is connected through screw 45 to the counter individual thereto. It is to be noted that while contact 42 is not employed to close any of the counter circuits of Fig. 5, it may be employed where it is desirable to close a circuit when the switch is in the normally open position shown in Fig. 2. In operation it will be seen that as mass 36 is moved from the position of Fig. 2 by an acceleration force of proper intensity, the tongue 31 is flexed against the force of spring 33 and the spring is compressed. As mass 36 moves toward the position of Fig. 3, spring 33 flexes switch leaf 27 upwardly, thus causing contact 41 to disengage contact 42 and to engage contact 43 to close the counter circuit. When the acceleration force has receded to 25% below the actuating value, the tongue 31 forces mass 36 back to the position of Fig. 2 and spring 33 flexes switch leaf 27 downwardly, which moves contact 41 away from contact 43 and into engagement with contact 42.

Figure 4:
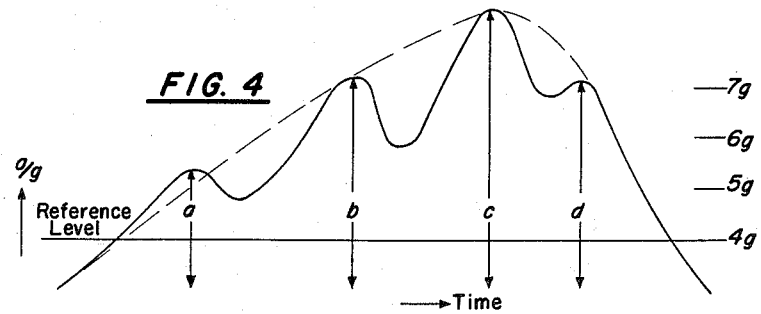
Fig. 4 is a typical acceleration-time curve of a maneuver.

In the operation of the present invention, the reference switch 17 is adjusted to react to an acceleration of a certain intensity or magnitude which is on the threshold of force magnitudes dangerous to the aircraft structure after numerous occurrences and which hereinafter will be referred to as the reference level intensity. This is done by positioning the mass 36 on the tongue 31 of the switch at the proper distance from the mounting screw 28 to react to snap the switch from open to closed position at a desired acceleration force. The remaining microswitches 22, 22a and 22b are then adjusted to react to progressively greater accelerations in the same manner. Since the tongues act as lever arms for the individual masses, the most sensitive microswitch, the reference switch 17, will have its mass positioned farthest from its mounting screw, and the least sensitive microswitch, 22b, will have its mass positioned closest to its mounting screw. When an aircraft carrying the disclosed accelerometer is maneuvered or encounters an up or down draft, the structural members of the aircraft are subjected to loads of varying intensity. These maneuvering or gust loads occur in uneven waves with high-frequency low-amplitude variations superimposed on the primary wave, as shown in Fig. 4. When the aircraft is subjected to a load of greater than the reference level intensity, the microswitch 17 is closed in the manner heretofore described, thus activating the counter 18. At the same time, a holding voltage is applied across each of the resistors 23, 23a and 23b. This holding voltage is insufficient to activate or move to a new indicating position the counters 21, 21a and 21b by itself, but is sufficient to hold them in a cocked position, and in the indicating position to which they were moved by the closing of their respective microswitches. As the load increases in intensity, the microswitches 22, 22a and 22b are successively closed and their counters activated. In counters such as used in the present invention, a coil and armature are employed for the operation thereof. The counter is moved, when the coil is energized, by the full or "pull in" voltage of the power source, to an indicating position. The indicating position is also the "cocked" position or fully extended postion in which the counter is held by a reduced or "holding" voltage after the switch individual thereto opens, the holding voltage passing through one of the resistors 22, 22a or 22b. Thus, if a counter has been activated by its switch, it cannot be activated again as long as the holding voltage is applied thereto by reference switch 17. As the load recedes in intensity, each microswitch is opened by the snap action of its switch leaf. The switches are so constructed as to release to open position (Fig. 2) at load intensities approximately 25% below those required to close them. The holding voltages are therefore applied until the load intensity falls to about 25% less than the reference level at which point the switch 17 moves to the open position and all counters return to a deenergized position and are ready for activation when the next acceleration occurs. Since the counters cannot be indexed again as long as they are cocked, the peaks a, b, c and d of Fig. 4 are not individually registered, but instead, the single peak of the primary wave alone is counted.

If it is desirable that the movements of the masses of the switches be damped, damping fluid may be inserted between the damping plates 38 and 39 and the adjacent sides of the masses. The surface tension of the damping fluid will then serve to damp the motions of the masses.

While four recording units are illustrated, it is understood that the number of units may be varied so as to count acceleration maxima at any desired number of acceleration levels. The load levels at which the microswitches are released can also be varied by the choice of switch leaves of proper stiffness and of springs of proper strength.

The disclosed accelerometer is primarily used to count maneuvering and gust loads in aircraft or similar vehicles, but by the addition of an air-speed and/or an altitude switching device, it can be used to count the occurrence of acceleration in given air-speed or altitude bans.

Obviously many modifications and variations of the present invention are possible in the light of the above teachings. It is therefore to be understood, that within the scope of the appended claims, the invention may be practiced otherwise than as specifically described.

What I claim is:

1. A maneuvering loads accelerometer comprising a source of current; a reference acceleration sensing element connected in series with said source; a reference counter and a plurality of registering units each connected in parallel with said source and said sensing element, each of said units including a counter connected in series with an acceleration sensing element shunted by a resistor.

2. A maneuvering loads accelerometer comprising a source of current a reference acceleration sensing element connected in series with said source; and a plurality of registering units connected in parallel with the source and said sensing element, each of said units including a counter connected in series with an acceleration sensing element shunted by a resistor.

3. A maneuvering loads accelerometer comprising a source of current; a reference acceleration sensing element connected in series with said source; a reference counter and at least one registering unit connected in parallel with the source and said sensing element, said unit including a counter connected in series with an acceleration sensing element shunted by a resistor.

4. A maneuvering loads accelerometer comprising a source of current; a reference acceleration force-sensitive switch connected in series with said source; a reference counter and a plurality of registering units each connected in parallel with said source and said switch, each of said units including a counter connected in series with an acceleration force-sensitive switch shunted by a resistor, each switch being responsive to an acceleration force of a different magnitude or intensity.

5. A maneuvering loads accelerometer comprising a source of current; a microswitch responsive to a reference acceleration and connected in series with said source; a reference-acceleration counter and a plurality of registering units each connected in parallel with the source and said microswitch, each of said units including a counter connected in series with an acceleration-responsive microswitch shunted by a resistor, each of the shunted switches being responsive to a different acceleration of progressively greater magnitude than the reference acceleration.

6. A maneuvering loads accelerometer comprising a source of current; an acceleration-responsive microswitch connected in series with said source; a counter and a plurality of registering units each connected in parallel with the source and said microswitch, each of said units including a counter connected in series with an acceleration-responsive microswitch shunted by a resistor, each of the microswitches being adjustable to respond to accelerations of different magnitudes, thereby facilitating use of the accelerometer over a wide range of acceleration magnitudes.

References Cited in the file of this patent

UNITED STATES PATENTS

| | | |
|---|---|---|
| 1,148,325 | Kjellgren | July 27, 1915 |
| 1,744,840 | Strieby et al. | Jan. 28, 1930 |
| 2,181,728 | Greentree | Nov. 28, 1939 |
| 2,554,728 | Barber | May 29, 1951 |
| 2,574,361 | Vincent | Nov. 6, 1951 |
| 2,629,030 | Taylor et al. | Feb. 17, 1953 |
| 2,699,896 | Piper | Jan. 18, 1955 |